United States Patent
Yamamura (10) Patent No.: US 8,922,894 B2
(45) Date of Patent: Dec. 30, 2014

(54) LENS UNIT, EXPOSURE DEVICE, LED HEAD, IMAGE FORMATION APPARATUS, AND READING APPARATUS

(71) Applicant: Oki Data Corporation, Tokyo (JP)

(72) Inventor: Akihiro Yamamura, Takasaki (JP)

(73) Assignee: Oki Data Corporation, Tokyo (JP)

( * ) Notice: Subject to any disclaimer, the term of this patent is extended or adjusted under 35 U.S.C. 154(b) by 60 days.

(21) Appl. No.: 13/897,479

(22) Filed: May 20, 2013

(65) Prior Publication Data
US 2013/0314680 A1 Nov. 28, 2013

(30) Foreign Application Priority Data
May 28, 2012 (JP) .................................. 2012-120818

(51) Int. Cl.
| | |
|---|---|
| *G02B 27/10* | (2006.01) |
| *F21K 99/00* | (2010.01) |
| *G02B 3/00* | (2006.01) |
| *G02B 26/12* | (2006.01) |

(52) U.S. Cl.
CPC . *F21K 9/50* (2013.01); *G02B 3/005* (2013.01); *G02B 3/0062* (2013.01); *G02B 3/0056* (2013.01); *G02B 3/0068* (2013.01); *G02B 26/123* (2013.01); *G02B 26/125* (2013.01)

USPC .............................. 359/621; 355/67; 362/268

(58) Field of Classification Search
CPC .. G02B 3/0056; G02B 3/0062; G02B 3/0068; G02B 3/005; G02B 26/123; G02B 26/125; F21K 9/50
USPC ...................... 359/621–624; 355/67; 362/268
See application file for complete search history.

(56) References Cited

U.S. PATENT DOCUMENTS 8,000,015 B2 * 8/2011 Yamamura .................... 359/622

FOREIGN PATENT DOCUMENTS

JP 2010-164658 A 7/2010

* cited by examiner

*Primary Examiner* — William Choi
(74) *Attorney, Agent, or Firm* — Marvin A. Motsenbocker; Mots Law, PLLC

(57) ABSTRACT

A lens unit includes a first lens plate including first lenses arranged in a first direction and configured to form an intermediate image being an inverted reduced image of an object, a second lens plate including second lenses arranged in the first direction and configured to form an inverted enlarged image of the intermediate image on a light reception surface, and a positioning portion being in contact with both a butting portion formed on the first lens plate and a butting portion formed on the second lens plate.

16 Claims, 11 Drawing Sheets

LENS UNIT, EXPOSURE DEVICE, LED HEAD, IMAGE FORMATION APPARATUS, AND READING APPARATUS

CROSS REFERENCE TO RELATED APPLICATIONS

This application claims priority based on 35 USC 119 from prior Japanese Patent Application No. 2012-120818 filed on May 28, 2012, entitled "LENS UNIT, EXPOSURE DEVICE, LED HEAD, IMAGE FORMATION APPARATUS, AND READING APPARATUS", the entire contents of which are incorporated herein by reference.

BACKGROUND OF THE INVENTION

1. Field of the Invention

The disclosure relates to a lens unit, an exposure device, an LED head, an image formation apparatus, and a reading apparatus.

2. Description of Related Art

Heretofore, a lens unit in which two lens arrays, each having linearly arranged lenses opposed to each other, is used in an optical system of an electrophotographic image formation apparatus that uses an LED head in which LEDs (Light Emitting Diodes) are linearly arranged. Such an arrangement has heretofore likewise been used in an optical system of a reading apparatus, such as a scanner or a facsimile machine, configured to form an image of a read original document on a light reception unit in which light reception elements are linearly arranged (for example, see Patent Document 1: Japanese Patent Application Publication No. 2010-164658 (paragraphs [0019] to [0022], and FIG. 1)).

SUMMARY OF THE INVENTION

However, the conventional technique has a problem in that the lens arrays of the optical system are long and thus the entire lens unit is difficult to highly accurately build up.

An embodiment of the invention aims to facilitate the building up of a lens unit with a high level of accuracy.

An aspect of the invention is a lens unit including: a first lens plate including first lenses arranged in a first direction and configured to form an intermediate image being an inverted reduced image of an object; a second lens plate including second lenses arranged in the first direction and configured to form an inverted enlarged image of the intermediate image on a light reception surface; and a positioning portion being in contact with both a butting portion formed on the first lens plate and a butting portion formed on the second lens plate.

The above aspect can facilitate building up a lens unit accurately.

DETAILED DESCRIPTION OF EMBODIMENTS

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Hereinbelow, embodiments of a lens unit, an exposure device, an LED head, an image formation apparatus, and a reading apparatus according to the invention are described with reference to the drawings.

(First Embodiment)

Figure 1:
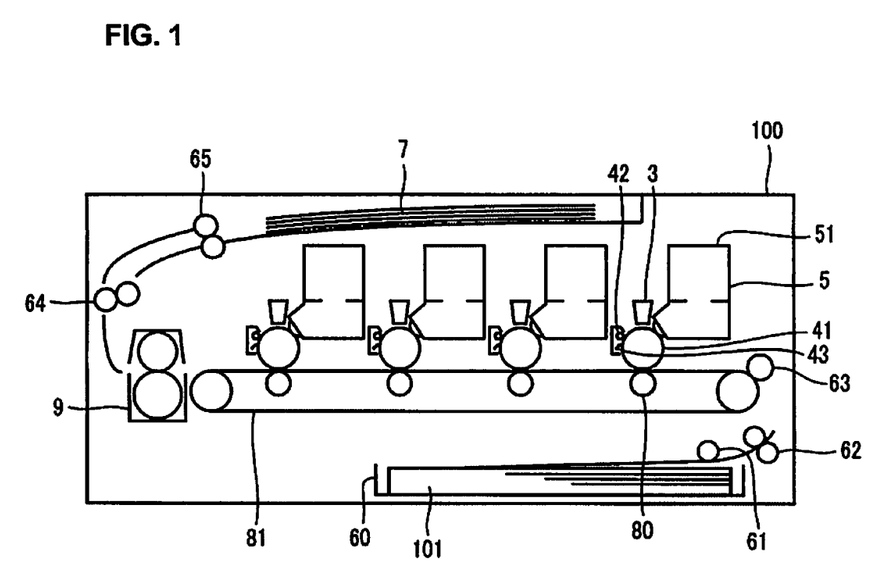
FIG. 1 is a schematic view illustrating a configuration of a printer according to a first embodiment of the invention.

A printer as an image formation apparatus according to a first embodiment of the invention is described based on FIG. 1 which is a schematic view illustrating a configuration of the printer of this embodiment.

In FIG. 1, printer 100 is configured to form an image on a print medium in accordance with image data by using toner made of a resin which contains a pigment as a coloring material. Paper cassette 60 is attached to printer 100 and is configured to store a stack of paper 101 as print media. Moreover, feed roller 61 and transport rollers 62 and 63 are arranged in printer 100. Feed roller 61 is configured to pick up paper 101 from paper cassette 60, and transport rollers 62 and 63 are configured to transport paper 101 thus fed.

Printer 100 of the embodiment is a color electrophotographic printer. In printer 100, image formation units are arranged side by side along a transport path of paper 101. The image formation units are configured to form images of yellow, magenta, cyan, and black, respectively. Each of the image formation units includes: photosensitive drum 41 serving as an electrostatic latent image carrier; developer 5 configured to form a toner image on photosensitive drum 41 by developing, with toner, an electrostatic latent image formed on photosensitive drum 41; and toner cartridge 51 configured to supply toner to developer 5.

In addition, charging roller 42 and LED (Light Emitting Diode) head 3 serving as an optical head are arranged opposed to a surface of photosensitive drum 41. Charging roller 42 is configured to supply electric charges to and thereby to electrically charge the surface of photosensitive drum 41. LED head 3 is configured to selectively irradiate the surface of photosensitive drum 41, which is charged by charging roller 42, with light in accordance with image data and thereby to form an electrostatic latent image thereon.

Moreover, transfer roller 80 is disposed opposed to photosensitive drum 41 in such a way as to sandwich transfer belt 81, which serves as a transfer unit configured to transport paper 101, between itself and photosensitive drum 41. Cleaning blade 43 is disposed in contact with the surface of photosensitive drum 41. Transfer roller 80 is configured to transfer, on paper 101, a toner image being an image formed on photosensitive drum 41 by visualizing an electrostatic latent image by use of toner. Cleaning blade 43 is configured to remove toner which is left on the surface of photosensitive drum 41 after paper 101 passes on the transfer unit. Fixation unit 9, transport rollers 64, and discharge rollers 65 are arranged on a downstream side of the transfer unit. Fixation unit 9 is configured to fix a toner image formed on paper 101, by application of heat and pressure. Transport rollers 64 are configured to transport paper 101 after the passage of fixation unit 9. Discharge rollers 65 are configured to discharge paper 101, which is transported by transport rollers 64, to discharge portion 7 in which to keep a stack of paper 101 having an image formed thereon.

An unillustrated power supply applies predetermined voltages to charging rollers 42 and transfer rollers 80. Transfer belt 81, photosensitive drums 41, and the rollers are driven to rotate by unillustrated motors and unillustrated drive transmission gears. In addition, the unillustrated power supply and a control device are connected to developers 5, LED heads 3, fixation units 9, and the unillustrated motors.

Printer 100 includes an external interface configured to receive print data from an external device, and to form an image on a print medium in accordance with the print data received by the external interface. Printer 100 having the above configuration includes a controller serving as a control unit and a calculation unit configured to store a control program in a storage, such as a memory, and perform overall control over printer 100 in accordance with the control program.

Next, a configuration of each LED head is described by using FIGS. 2 to 6.

Figure 2:
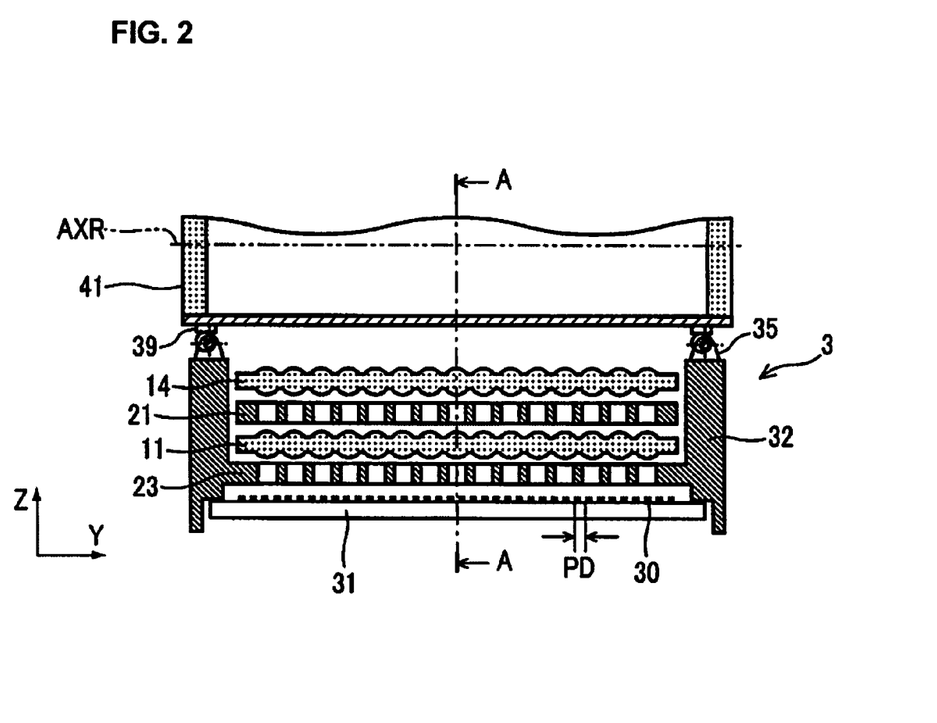
FIG. 2 is a cross-sectional view of an LED head of the first embodiment taken in a long-side direction thereof.

FIG. 2 is a cross-sectional view of the LED head of the first embodiment taken in a long-side direction thereof. LED head 3 is a long unit, and in FIG. 2, LED head 3 is a long unit. In FIG. 2, the long-side direction of LED head 3 is equal to a horizontal direction of the drawing (Y direction). LED elements 30 as light emitting elements are located in a lower part of the drawing, and photosensitive drum 41 as an imaging surface is located in an upper part of the drawing.

Figure 3:
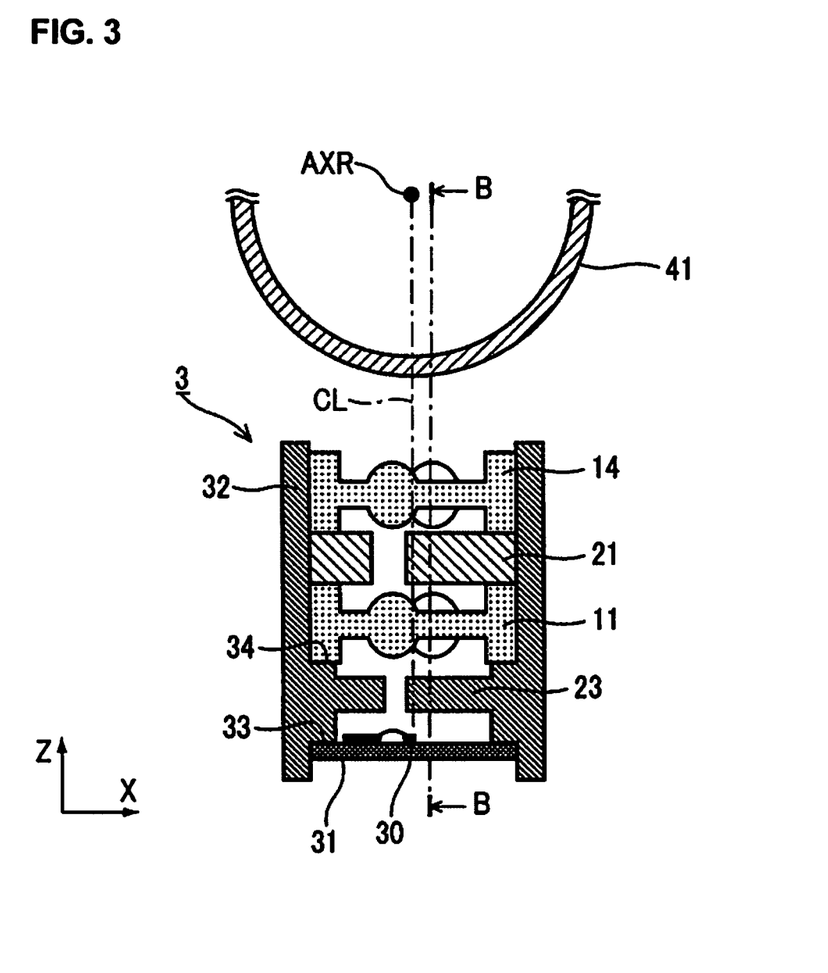
FIG. 3 is a cross-sectional view of the LED head of the first embodiment taken in a short-side direction thereof.

FIG. 3 is a cross-sectional view of the LED head of the first embodiment taken in a short-side direction thereof, and is a cross-sectional view taken along a plane orthogonal to the long-side direction thereof. In FIG. 3, the long-side direction of LED head 3 is equal to a front-back direction of the drawing. LED elements 30 are located in a lower part of the drawing, and photosensitive drum 41 is located in an upper part of the drawing. Here, FIG. 2 is a cross-sectional view of FIG. 3 taken along the B-B line, and FIG. 3 is a cross-sectional view of FIG. 2 taken along the A-A line.

Figure 4:
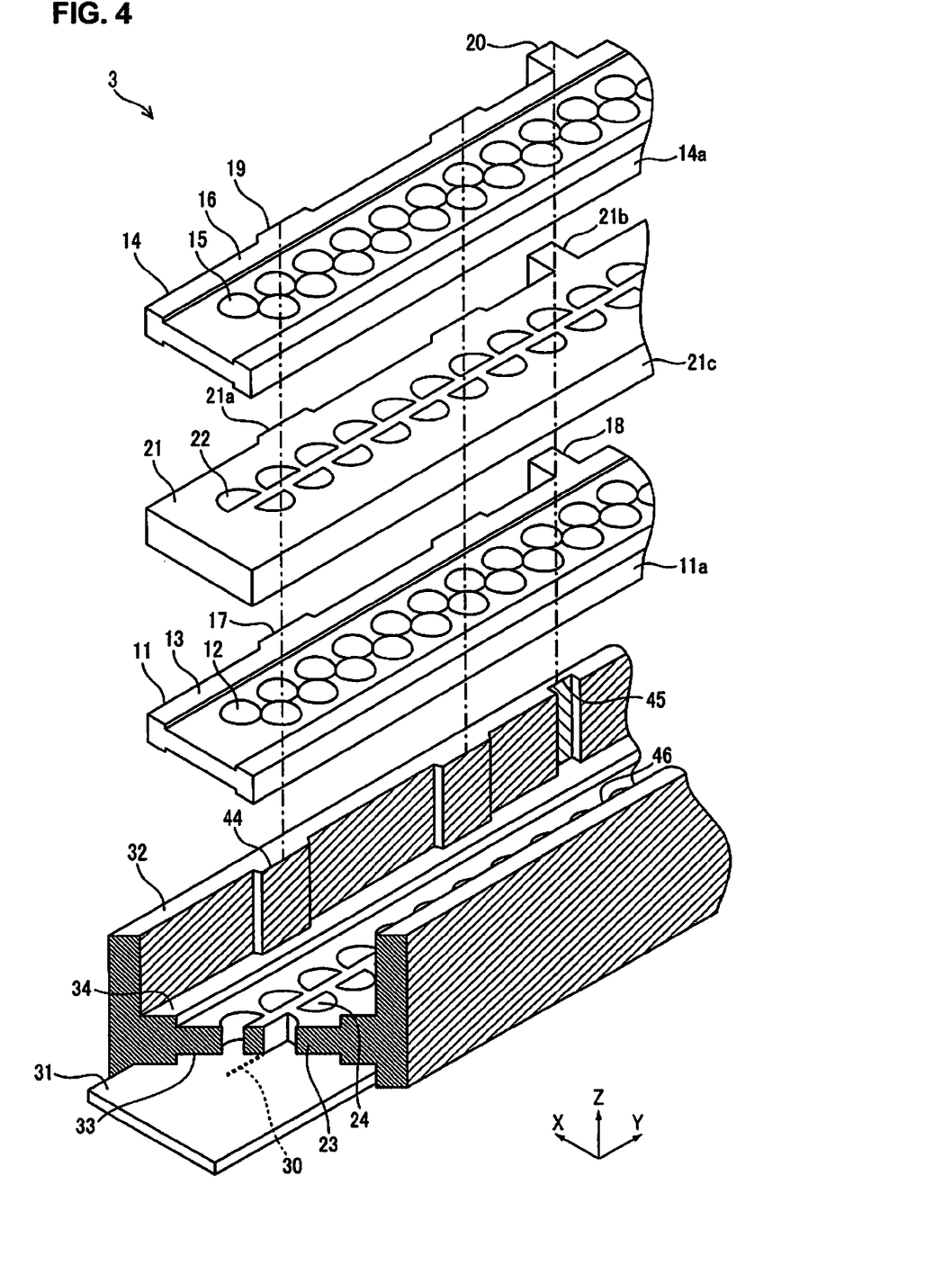
FIG. 4 is an exploded perspective view of the LED head of the first embodiment.
Figure 5:
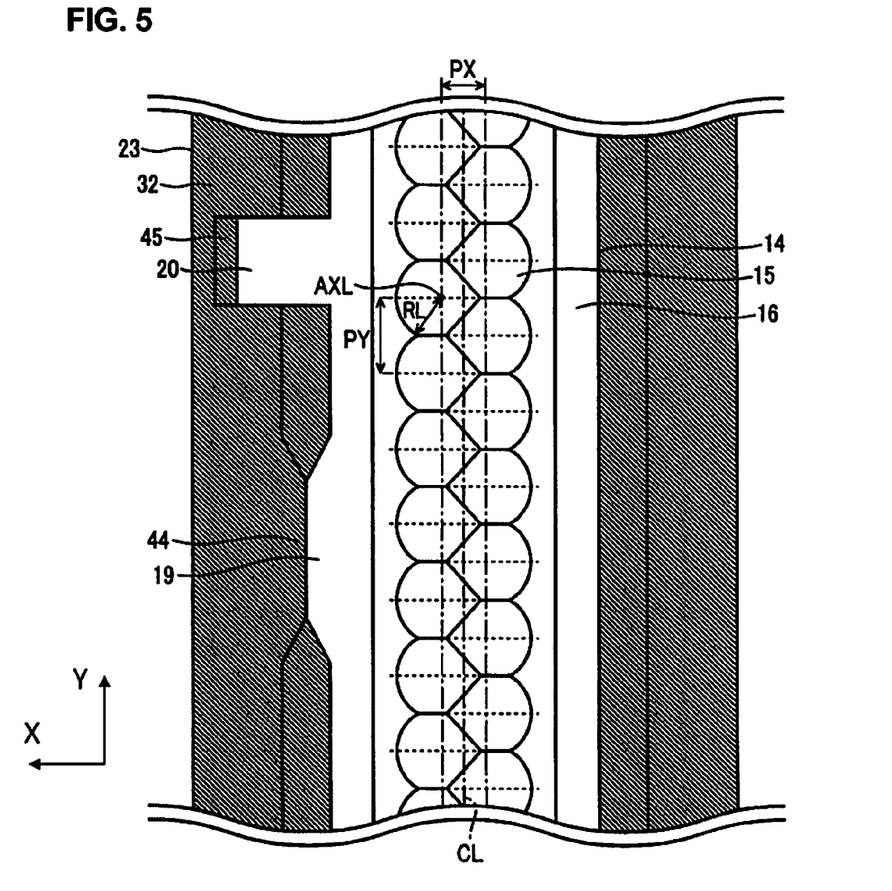
FIG. 5 is a front view of the LED head of the first embodiment.
Figure 6:
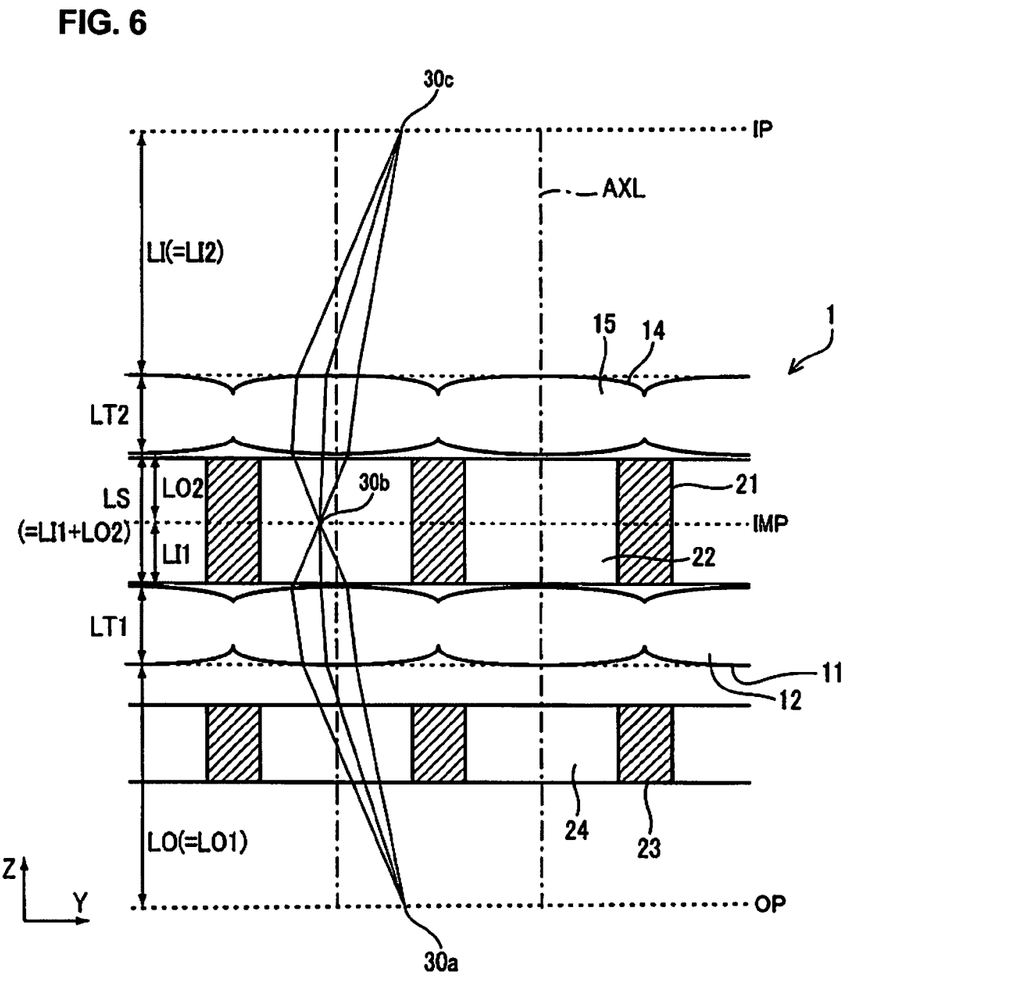
FIG. 6 is a cross-sectional view of a lens unit of the first embodiment.

FIG. 4 is an exploded perspective view of the LED head of the first embodiment, and FIG. 5 is a front view of the LED head of the first embodiment. FIG. 5 is the front view of LED head 3 illustrated in FIGS. 2 and 3 as seen from photosensitive drum 41 as the imaging surface toward LED elements 30. In FIG. 5, the long-side direction of LED head 3 is equal to a vertical direction of the drawing (Y direction). FIG. 6 is a cross-sectional view of a lens unit of the first embodiment and is a cross-sectional view taken along the B-B line in FIG. 3. In FIG. 6, the long-side direction of LED head 3 is equal to a horizontal direction of the drawing (Y direction), LED elements 30 are located in a lower part of the drawing, and photosensitive drum 41 is located in an upper part of the drawing.

LED head 3 includes: substrate 31 serving as a light-emitting-element array on which LED elements 30 as the light emitting elements are arranged substantially linearly in a first direction (Y direction); first lens plate 11 serving as a lens array including first lenses 12 arranged in a long-side direction of the plate (Y direction: first direction) and configured to form an inverted reduced image (intermediate image) of LED elements 30 serving as an object; second lens plate 14 serving as a lens array including second lenses 15 arranged in a long-side direction of the plate and configured to form an inverted enlarged image of the inverted reduced image of LED elements 30 on a light reception surface; light blocking plate 21 serving as a first light blocking member disposed between first lens plate 11 and second lens plate 14; mask 23 serving as a second light blocking member disposed between LED elements 30 and first lens plate 11; adjustment member 35 configured to adjust the distance between mask 23 and photosensitive drum 41 as the imaging surface; and holder 32 configured to hold and fix therein substrate 31, first lens plate 11, second lens plate 14, light blocking plate 21, and mask 23.

In FIG. 2, all of substrate 31, first lens plate 11, second lens plate 14, light blocking plate 21, and mask 23 are long members. As illustrated in FIG. 2, these members are arranged to extend in the horizontal direction of the drawing (Y direction) in such a way that their long-side directions extend parallel with one another. LED elements 30 are arranged substantially linearly at equal pitches. In the case of LED head 3 of 600 dpi (dot per inch) indicating that 600 LED elements 30 are arranged per inch (1 inch=about 25.4 mm), LED elements 30 are arranged at a pitch of 0.04233 mm.

Moreover, in FIG. 2, LED elements 30 are arranged in the horizontal direction of the drawing (Y direction) which is the long-side direction of LED head 3. Reference sign 41 indicates the photosensitive drum on which an electrostatic latent image is formed, and reference sign AXR indicates the rotational axis of photosensitive drum 41. Rotational axis AXR extends in the horizontal direction of the drawing (Y direction) which is parallel with the arrangement direction of LED elements 30. Reference sign 33 indicates a substrate butting portion provided to mask 23 while in contact with substrate 31 in such a way that the interval between surfaces of mask 23 and substrate 31 is uniform across the long-side direction of these members.

Reference sign 35 indicates the adjustment member, capable of adjusting the interval between surfaces of mask 23 and photosensitive drum 41. Adjustment member 35 is provided to mask 23 in such a way that the interval between the surfaces of mask 23 and photosensitive drum 41 is uniform across the long-side direction of these members. Adjustment member 35 is an eccentric cam, for example. Reference sign 39 indicates a slide member disposed along the surface of photosensitive drum 41 in such a way that the interval between the surface of photosensitive drum 41 and adjustment member 35 is uniform during the rotation of photosensitive drum 41.

In FIG. 3, reference sign 34 indicates a lens butting portion provided to mask 23 in such a way that the interval between surfaces of mask 23 and first lens plate 11 is uniform across the long-side direction of these members. Moreover, in FIG. 3, a width direction (short-side direction) of each of LED head 3, first lens plate 11, and second lens plate 14 is equal to the horizontal direction of the drawing (X direction), and reference sign CL indicates a center line of each of first lens plate 11 and second lens plate 14 in its width direction. In this case, as illustrated in FIG. 3, LED elements 30 and rotational axis AXR of photosensitive drum 41 are located on an extrapolated straight line from center line CL. The optical axis of each of the microlenses of first lens plate 11 and second lens plate 14 extends parallel with center line CL, i.e., extends in a vertical direction of FIG. 3 (Z direction).

FIG. 4 is an exploded perspective view of the LED head of the first embodiment. In FIG. 4, first lens plate 11, second lens plate 14, and LED elements 30 are arranged in such a way that the optical axis of each of first lenses 12, which are microlenses of first lens plate 11, and second lenses 15, which are microlenses of second lens plate 14, extends in a vertical direction of the drawing (Z direction). LED elements 30 are located in a lower part of the drawing, and second lens plate 14 is located in an upper part of the drawing. An image of LED elements 30 is formed in the upper part of the drawing.

In LED head 3, substrate 31 (LED elements 30), mask 23, first lens plate 11, light blocking plate 21, and second lens plate 14 are arranged in this order from the lower part in FIG. 4. First lenses 12 are arranged in two rows on first lens plate 11, second lenses 15 are arranged in two rows on second lens plate 14, first diaphragms 22 are arranged in two rows on light blocking plate 21, and second diaphragms 24 are arranged in two rows on mask 23. First lenses 12, second lenses 15, first diaphragms 22, and second diaphragms 24 are arranged at the same pitches in such a way that positions of the optical axis of each of first lenses 12, the optical axis of the corresponding second lens 15, the corresponding first diaphragm 22, and the corresponding second diaphragm 24 match one another. In other words, LED head 3 has a configuration where a pair of lens groups, formed of microlenses arranged in such a way that the optical axes of the opposed lenses match each other, are arranged substantially linearly in a direction orthogonal to the optical axes of the lenses.

Next, mask 23 is described. Reference sign 32 indicates the holder fixing therein substrate 31, first lens plate 11, second lens plate 14, light blocking plate 21, and mask 23. Holder 32 is formed integrally with mask 23 to extend across the long-side direction of LED head 3. Lens butting portion 34 is formed outside second diaphragms 24, and holder 32 is formed outside lens butting portion 34 in the width direction of mask 23 in FIG. 4 (X direction). Both lens butting portion 34 and holder 32 are formed to extend in a long-side direction of mask 23 (Y direction). Second diaphragms 24 are arranged in two rows on mask 23. The arrangement pitch between second diaphragms 24 is the same as that between first lenses 12 which is PY in the long-side direction (Y direction) and PX in the width direction (X direction).

Reference sign 44 indicates lens plate positioning portions provided to mask 23 formed integrally with holder 32. Lens plate positioning portions 44 are formed to be in contact with both positioning protrusions 17 of first lens plate 11 and positioning protrusions 19 of second lens plate 14. Lens plate positioning portions 44 are arranged at multiple positions of mask 23 in the long-side direction of mask 23 (Y direction). Reference sign 45 indicates a lens plate long-side direction positioning portion provided to mask 23 formed integrally with holder 32. Lens plate long-side direction positioning portion 45 is disposed at substantially the center in the long-side direction of mask 23 (Y direction). Here, mask 23 is made of a material designed to block light rays from LED elements 30.

Next, first lens plate 11 is described.

Reference sign 13 indicates ribs formed on first lens plate 11 to extend across the long-side direction of first lens plate 11 (Y direction). Ribs 13 are configured to make uniform the interval between surfaces of first lenses 12 and second diaphragms 24, and the interval between surfaces of first lenses 12 and first diaphragms 22 across the long-side direction of LED head 3 (Y direction), by coming into contact with lens butting portion 34 which is formed to extend across the long-side direction of mask 23 (Y direction).

Reference sign 17 indicates the positioning protrusions arranged at multiple positions of first lens plate 11 in the long-side direction of first lens plate 11 (Y direction). Reference sign 18 indicates a long-side direction positioning protrusion disposed at substantially the center of first lens plate 11 in the long-side direction of first lens plate 11 (Y direction). The position of first lens plate 11 in the width direction of first lens plate 11 in FIG. 4 (X direction) is determined by bringing lens plate positioning portions 44 into contact with positioning protrusions 17 formed on first lens plate 11, and bringing butting surface 46 formed in holder 32 into contact with butting surface 11a which is formed on the opposite side of first lens plate 11 from positioning protrusions 17 in the width direction of first lens plate 11.

Next, light blocking plate 21 is described.

First diaphragms 22 are arranged in two rows on light blocking plate 21 in the long-side direction of light blocking plate 21 (Y direction). The arrangement pitch between first diaphragms 22 is the same as that between first lenses 12 which is PY in the long-side direction (Y direction) and PX in the width direction (X direction). Here, light blocking plate 21 is made of a material designed to block light rays from LED elements 30.

The position of light blocking plate 21 in the direction where the optical axes of first lenses 12 extend in FIG. 4 (Z direction) is determined by bringing light blocking plate 21 into contact with ribs 13 of first lens plate 11. Moreover, the position of light blocking plate 21 in the long-side direction of light blocking plate 21 in FIG. 4 (Y direction) is determined by causing protrusion portion 21b formed on light blocking plate 21 to be fitted into lens plate long-side direction positioning portion 45. Further, the position of light blocking plate 21 in the width direction of light blocking plate 21 in FIG. 4 (X direction) is determined by bringing protrusion portions 21a formed on light blocking plate 21 into contact with lens plate positioning portions 44, and bringing butting surface 46 formed in holder 32 into contact with butting surface 21c which is formed on the opposite side of light blocking plate 21 from protrusion portions 21a in the width direction of light blocking plate 21 in FIG. 4 (X direction).

Next, second lens plate 14 is described.

Reference sign 16 indicates ribs formed on second lens plate 14 to extend across the long-side direction of second lens plate 14 (Y direction). Ribs 16 are configured to make uniform the interval between surfaces of second lenses 15 and first diaphragms 22 across the long-side direction of LED head 3 (Y direction) by coming into contact with light blocking plate 21. Reference sign 19 indicates the positioning protrusions arranged at multiple positions of second lens plate 14 in the long-side direction of second lens plate 14 (Y direction). Reference sign 20 indicates a long-side direction positioning protrusion disposed at substantially the center of second lens plate 14 in the long-side direction of second lens plate 14 (Y direction).

The position of second lens plate 14 in the width direction of second lens plate 14 in FIG. 4 (X direction) is determined by bringing positioning protrusions 19 formed on second lens plate 14 into contact with lens plate positioning portions 44 and bringing butting surface 46 formed in holder 32 into contact with butting surface 14a which is formed on the opposite side of second lens plate 14 from positioning protrusions 19 in the width direction of second lens plate 14.

FIG. 5 is a front view of the LED head of the first embodiment. The shapes of the first lens plate and the second lens plate are described using FIG. 5. Here, the long-side direction of the first lens plate and the second lens plate is equal to a vertical direction of FIG. 5 (Y direction). Moreover, since the shape of the first lens plate is substantially the same as that of the second lens plate, the shape of the second lens plate is described below.

In FIG. 5, on second lens plate 14, second lenses 15 are alternately arranged zigzag in two rows which are parallel with each other in the long-side direction of second lens plate 14. Reference sign AXL indicates the optical axis of each second lens 15. The arrangement pitch between second lenses 15 is PY in the long-side direction (Y direction) and PX in the width direction (X direction). Second lenses 15 are arranged in such a way that PY is larger than PX.

No flat portion is formed between adjacent two second lenses 15, and therefore adjacent two second lenses 15 abut on each other at their boundary and are arranged densely without any gap in between. In other words, a radius of each second lens 15 in the long-side direction of second lens plate 14 is equal to PY/2. Moreover, radius RL of second lens 15 is larger than PY/2. Here, second lens plate 14 is made of a material designed to transmit light rays from the light emitting unit.

First lens plate 11 has substantially the same shape as second lens plate 14. First lenses 12 have substantially the same shapes as and are arranged substantially in the same manner as second lenses 15. Reference sign CL indicates a center line of the lens unit. In the case where first lenses 12 and second lenses 15 are arranged in two rows, center line CL is a straight line parallel with the lens rows and located in an intermediate portion between the two lens rows. In the case where first lenses 12 and second lenses 15 are arranged in a single row, center line CL matches a straight line along which the lenses are arranged.

Positioning protrusions 19 are configured to reduce the warp of second lens plate 14 in the width direction of second lens plate (X direction) by butting against lens plate positioning portions 44 of mask 23, and thus to reduce the misalignment between the optical axes of second lenses 15 and first diaphragms 22 of FIG. 4 in the width direction of second lens plate 14 (X direction).

Likewise, in first lens plate 11 which is located at the back side of second lens plate 14 and is not illustrated in FIG. 5, positioning protrusions 17 are configured to reduce the warp of first lens plate 11 in the width direction of first lens plate (X direction) by butting against lens plate positioning portions 44 of mask 23, and thus to reduce the misalignment among the optical axes of first lenses 12, first diaphragms 22, and second diaphragms 24 of FIG. 4 in the width direction of first lens plate 11 (X direction).

Long-side direction positioning protrusion 20 is configured to reduce the misalignment between the optical axes of second lenses 15 and first diaphragms 22 of FIG. 4 in the long-side direction of second lens plate 14 (Y direction) by being fitted into lens plate long-side direction positioning portion 45 of mask 23. Likewise, in first lens plate 11 which is located at the back side of second lens plate 14 and is not illustrated in FIG. 5, long-side direction positioning protrusion 18 is configured to reduce the misalignment among the optical axes of first lenses 12, first diaphragms 22, and second diaphragms 24 of FIG. 4 in the long-side direction of first lens plate 11 (Y direction) by being fitted into lens plate long-side direction positioning portion 45 of mask 23.

FIG. 6 is a cross-sectional view of the lens unit of the first embodiment. In lens unit 1, mask 23, first lens plate 11, light blocking plate 21, and second lens plate 14 are arranged in this order from a lower part in FIG. 6. The interval between surfaces of these members is described using FIG. 6.

In FIG. 6, the distance between first lenses 12 and object plane OP, which is a plane in which object (LED element) 30$a$ is placed, is set at LO. The interval between surfaces of first lenses 12 and second lenses 15 is set at LS. The interval between imagine plane IP and the surface of second lenses 15 is set at LI. The thickness of each first lens 12 is set at LT1, and the thickness of each second lens 15 is set at LT2.

First lens 12 forms intermediate image 30$b$ in intermediate image plane IMP which is distance LI1 away from first lens 12 in a direction of optical axis AXL, as an image of object 30$a$ which is distance LO1 away from first lens 12 in the direction of optical axis AXL. Intermediate image 30$b$ formed at this time is an inverted reduced image of object 30$a$. Second lens 15 forms image 30$c$ of intermediate image 30$b$ which is distance LO2 away from second lens 15 in imaging plane IP, which is distance LI2 away from second lens 15 in the direction of optical axis AXL. Image 30$c$ formed at this time is a same-size erect image of object 30$a$. Distance LO between object plane OP and first lenses 12 is set equal to distance L01. Interval LS between first lenses 12 and second lenses 15 is set equal to LS=LI1+LO2, and distance LI between second lenses 15 and imaging plane IP is set equal to distance LI2.

Now, a description is given of how the above configuration works.

First of all, an operation of printer 100 is described based on FIG. 1.

The surface of each photosensitive drum 41 of printer 100 is electrically charged by charging roller 42 to which a certain voltage is applied from the unillustrated power supply. Then, when the charged surface of photosensitive drum 41 approaches LED head 3 along with the rotation of photosensitive drum 41, the charged surface is exposed to LED head 3 whereby an electrostatic latent image is formed thereon. The electrostatic latent image thus formed is developed by developer 5, and thereby a toner image is formed on the surface of photosensitive drum 41.

Meanwhile, paper 101 set in paper cassette 60 is picked up from paper cassette 60 by feed roller 61, and then transported to the vicinity of transfer roller 80 and transfer belt 81 by transport rollers 62 and 63. When the toner image on the surface of photosensitive drum 41 obtained by the development approaches transfer roller 80 and transfer belt 81 along with the rotation of photosensitive drum 41, the toner image on the surface of photosensitive drum 41 is transferred onto paper 101 by means of transfer belt 81 and transfer roller 80 to which the certain voltage is applied from the unillustrated power supply.

Subsequently, paper 101 having the toner images of the respective colors formed on its surface is transported to fixation unit 9 along with the rotation of transfer belt 81. Fixation unit 9 melts the toner images on paper 101 by applying pressure and heat to fix the toner images onto the surface of paper 101. Paper 101 on which the toner images are fixed is then discharged to discharge portion 7 by transport rollers 64 and discharge rollers 65. Thus, the operation of printer 100 is completed.

Next, the operation of LED head 3 is described based on FIG. 6.

When a controller of the printer sends a control signal to LED head 3, illustrated in FIG. 3, in accordance with image data, a driver IC on substrate 31 drives LED elements 30 to emit light at any light intensity in accordance with the control signal. First lens 12 forms intermediate image 30$b$ as an image of object 30$a$ in intermediate image plane IMP which is located inside first diaphragms 22. Intermediate image 30$b$ formed at this time is an inverted reduced image of object 30$a$.

Second lens 15 forms image 30$c$ in imaging plane IP as an image of intermediate image 30$b$. Image 30$c$ formed at this time is a same-size erect image of object 30$a$. Light rays to form image 30c are transmitted through second diaphragms 24 while light rays to cause a reduction in image contrast, i.e., so-called stray light rays, are blocked by mask 23.

In this embodiment, as illustrated in FIG. 4, positioning protrusions 17 are formed on first lens plate 11, positioning protrusions 19 are formed on second lens plate 14, lens plate positioning portions 44 are formed on mask 23, and lens plate positioning portions 44 are in contact with both positioning protrusions 17 and positioning protrusions 19. Thereby, the warp of first lens plate 11 and second lens plate 14 in their width direction (X direction) is reduced. In addition, since lens plate positioning portions 44 determine the positions of first lens plate 11 and second lens plate 14 in the width direction of LED head 3 (X direction), the optical axes of first lenses 12 can be accurately aligned with the optical axes of second lenses 15.

As described above, in the first embodiment, positioning protrusions are formed on the first lens plate and on the second lens plate. The lens plate positioning portions are formed on the mask, and the lens plate positioning portions are in contact with both the positioning protrusions of the first lens plate and the positioning protrusions of the second lens plate. This brings about effects of reducing the warp of the lens plates and facilitating building up the lens unit highly accurately.

(Second Embodiment)

Figure 7:
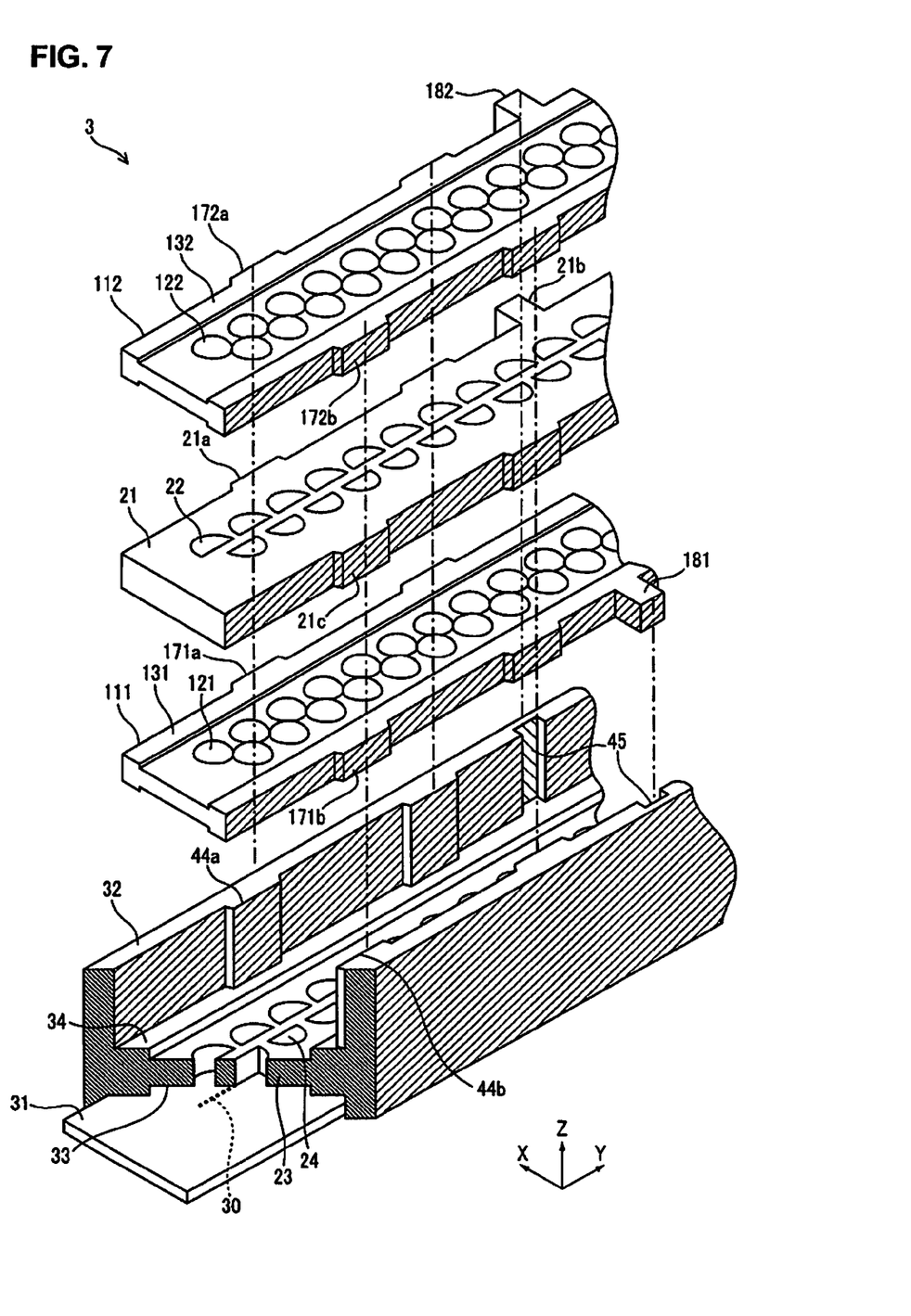
FIG. 7 is an exploded perspective view of an LED head of a second embodiment of the invention.
Figure 8:
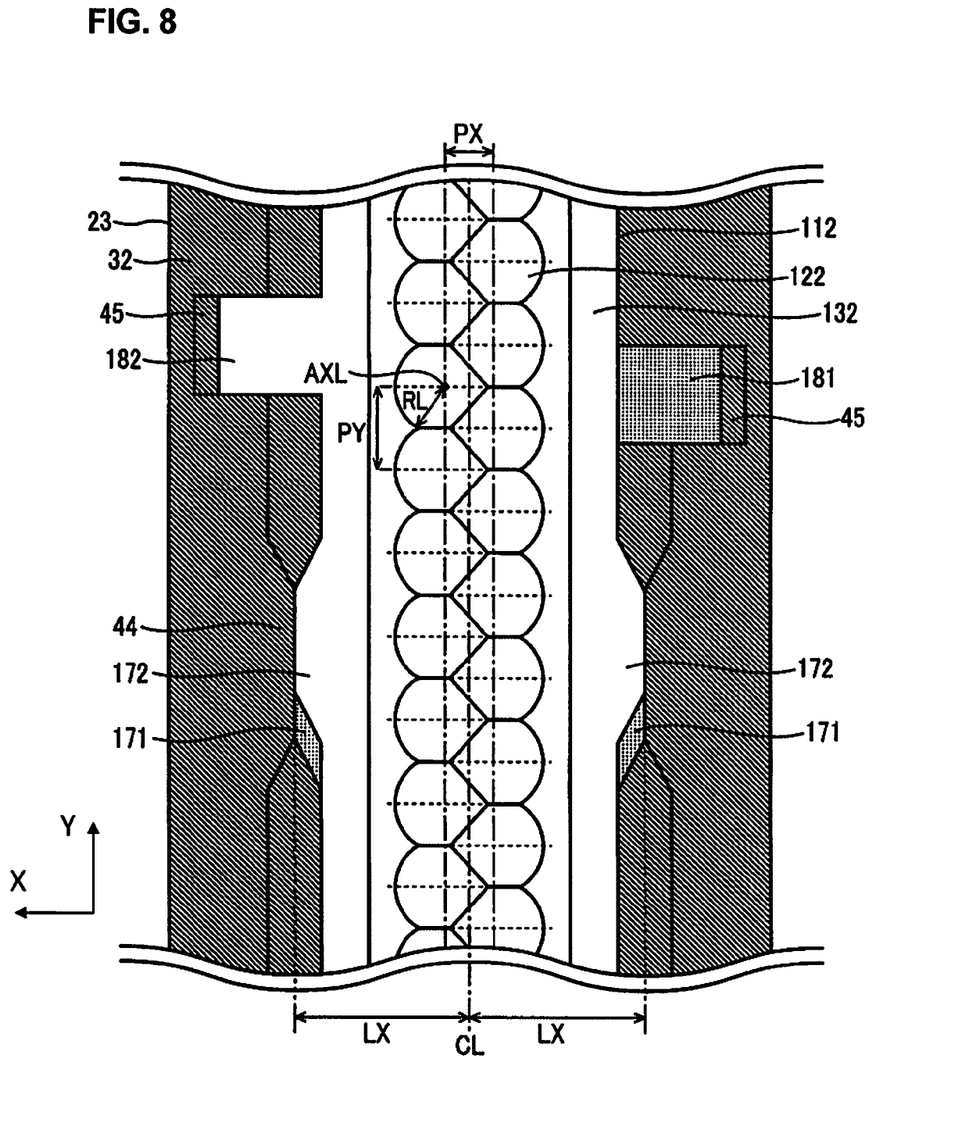
FIG. 8 is a front view of the LED head of the second embodiment.
Figure 9:
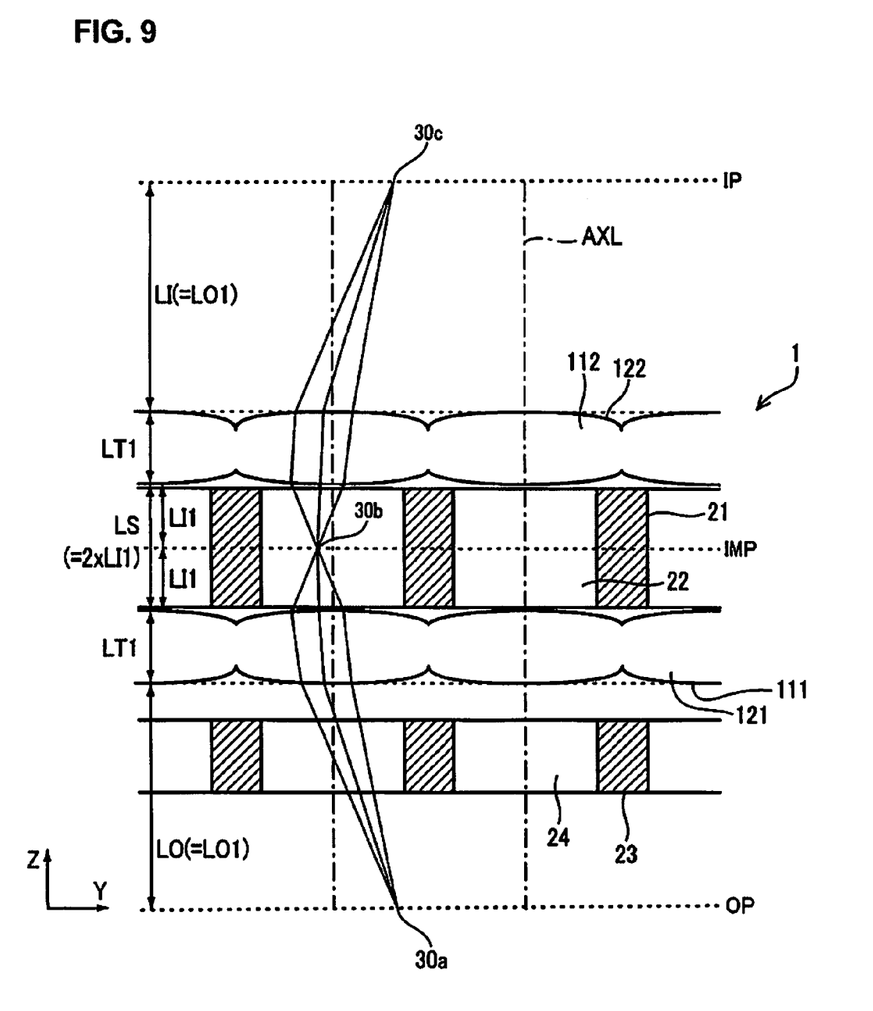
FIG. 9 is a cross-sectional view of a lens unit of the second embodiment.

Configurations of a lens unit and an LED head according to a second embodiment of the invention are described using FIGS. 7 to 9. Note that parts of the second embodiment which are the same as those of the first embodiment are given the same reference signs and description thereof is omitted. Moreover, a description of a configuration of an image formation apparatus of the second embodiment is omitted because this is the same as that of the first embodiment.

FIG. 7 is an exploded perspective view of the LED head of the second embodiment. FIG. 8 is a front view of the LED head of the second embodiment. FIG. 9 is a cross-sectional view of the lens unit of the second embodiment.

FIG. 8 is the front view of LED head 3 illustrated in FIGS. 2 and 3 as seen from photosensitive drum 41 as the imaging surface toward LED elements 30. In FIG. 8, the long-side direction of LED head 3 is equal to a vertical direction of the drawing (Y direction). FIG. 9 is the cross-sectional view taken along the B-B line in FIG. 3. In FIG. 9, the long-side direction of LED head 3 is equal to a horizontal direction of the drawing (Y direction), LED elements 30 are located in a lower part of the drawing, and photosensitive drum 41 is located in an upper part of the drawing.

In FIG. 7, first lens plate 111, second lens plate 112, and LED elements 30 are arranged in such a way that the optical axis of each of first lenses 121, which are microlenses of first lens plate 111, and second lenses 122, which are microlenses of second lens plate 112, extends in a vertical direction of the drawing (Z direction). LED elements 30 are located in a lower part of the drawing, and second lens plate 112 is located in an upper part of the drawing. An image of LED elements 30 is formed in the upper part of the drawing.

In LED head 3, substrate 31 (LED elements 30), mask 23, first lens plate 111, light blocking plate 21, and second lens plate 112 are arranged in this order from the lower part in FIG. 7. First lenses 121 are arranged in two rows on first lens plate 111. Second lenses 122 are arranged in two rows on second lens plate 112. First diaphragms 22 are arranged in two rows on light blocking plate 21, and second diaphragms 24 are arranged in two rows on mask 23. First lenses 121, second lenses 122, first diaphragms 22, and second diaphragms 24 are arranged at the same pitches in such a way that positions of the optical axis of each of first lenses 121, the optical axis of the corresponding second lens 122, the corresponding first diaphragm 22, and the corresponding second diaphragm 24 match one another.

Next, mask 23 is described.

Reference sign 44 (44a, 44b) indicates lens plate positioning portions formed to be in contact with both positioning protrusions 171 of first lens plate 111 and positioning protrusions 172 of second lens plate 112. Lens plate positioning portions 44 are arranged at multiple positions of mask 23 in the long-side direction of mask 23 (Y direction). In addition, lens plate positioning portions 44 are arranged at both sides of first lenses 121 in a width direction (X direction: third direction), which is orthogonal to a direction parallel with the optical axes of first lenses 121 (Z direction: second direction) and a direction in which first lenses 121 are arranged (Y direction: first direction), i.e., arranged at both sides of second diaphragms 24 in a width direction of mask 23 (X direction). Reference sign 45 indicates lens plate long-side direction positioning portions arranged at substantially the center in the long-side direction of mask 23 (Y direction). Lens plate long-side direction positioning portions 45 are arranged at both sides of second diaphragms 24 in the width direction of mask 23 (X direction).

Next, first lens plate 111 is described.

Reference sign 131 indicates ribs formed on first lens plate 111 to extend across the long-side direction of first lens plate 111 (Y direction). Ribs 131 are configured to make uniform the interval between surfaces of first lenses 121 and second diaphragms 24 and the interval between surfaces of first lenses 121 and first diaphragms 22 across the long-side direction of LED head 3 (Y direction) by coming into contact with lens butting portion 34 which is formed to extend across the long-side direction of mask 23 (Y direction).

Reference sign 171 (171a, 171b) indicates the positioning protrusions arranged at multiple positions of first lens plate 111 in the long-side direction of first lens plate 111 (Y direction). The positioning protrusions 171 are arranged at both sides of first lenses 121 in the width direction of first lens plate 111 (X direction). Reference sign 181 indicates a long-side direction positioning protrusion disposed at substantially the center of first lens plate 111 in the long-side direction of first lens plate 111 (Y direction). The position of first lens plate 111 in the width direction of first lens plate 111 in FIG. 7 (X direction) is determined by bringing lens plate positioning portions 44a into contact with positioning protrusions 171a formed on first lens plate 111, and bringing lens plate positioning portions 44b into contact with positioning protrusions 171b which are formed on the opposite side of first lens plate 111 from positioning protrusions 171a in the width direction of first lens plate 111.

Next, second lens plate 112 is described.

Reference sign 132 indicates ribs formed on second lens plate 112 to extend across the long-side direction of second lens plate 112 (Y direction). Ribs 16 are configured to make uniform the interval between surfaces of second lenses 122 and first diaphragms 22 across the long-side direction of LED head 3 (Y direction) by coming into contact with light blocking plate 21.

Reference sign 172 (172a, 172b) indicates the positioning protrusions arranged at multiple positions of second lens plate 112 in the long-side direction of second lens plate 112 (Y direction). The positioning protrusions 172 are arranged at both sides of second lenses 122 in the width direction of second lens plate 112 (X direction). Reference sign 182 indicates a long-side direction positioning protrusion disposed at substantially the center of second lens plate 112 in the long-side direction of second lens plate 112 (Y direction). The position of second lens plate 112 in the width direction of second lens plate 112 in FIG. 7 (X direction) is determined by bringing lens plate positioning portions 44a into contact with positioning protrusions 172a formed on second lens plate 112, and bringing lens plate positioning portions 44b into contact with positioning protrusions 172b which are formed on the opposite side of second lens plate 112 from positioning protrusions 172a in the width direction of second lens plate 112.

The position of light blocking plate 21 in the direction where the optical axes of first lenses 121 extend in FIG. 7 (Z direction) is determined by bringing light blocking plate 21 into contact with ribs 131 of first lens plate 111. Moreover, the position of light blocking plate 21 in the long-side direction of light blocking plate 21 in FIG. 7 (Y direction) is determined by causing protrusion portion 21b formed on light blocking plate 21 to be fitted into one of lens plate long-side direction positioning portions 45. Further, the position of light blocking plate 21 in the width direction of light blocking plate 21 in FIG. 7 (X direction) is determined by bringing protrusion portions 21a formed on light blocking plate 21 into contact with lens plate positioning portions 44a, and bringing lens plate positioning portions 44b into contact with protrusion portions 21c which are formed on the opposite side of light blocking plate 21 from protrusion portions 21a in the width direction of light blocking plate 21 in FIG. 7 (X direction).

The shapes of the first lens plate, the second lens plate, and the mask are described using FIG. 8. Here, the long-side direction of the first lens plate and the second lens plate is equal to the vertical direction of FIG. 8 (Y direction). Moreover, since the shape of the first lens plate is substantially the same as that of the second lens plate, the shape of the second lens plate is described below.

In FIG. 8, on second lens plate 112, second lenses 122 are alternately arranged zigzag in two rows which are parallel with each other in the long-side direction of second lens plate 122. Reference sign AXL indicates the optical axis of each second lens 122. The arrangement pitch between second lenses 122 is PY in the long-side direction (Y direction) and PX in the width direction (X direction). Second lenses 122 are arranged in such a way that PY is larger than PX.

No flat portion is formed between adjacent two second lenses 122, and therefore adjacent two second lenses 122 abut on each other at their boundary and are arranged densely without any gap in between. In other words, a radius of each second lens 122 in the long-side direction of second lens plate 112 is equal to PY/2. Moreover, radius RL of second lens 122 is larger than PY/2. Here, second lens plate 112 is made of a material designed to transmit light rays from the light emitting unit.

First lens plate 111 has substantially the same shape as second lens plate 112. First lenses 121 have substantially the same shapes, and are arranged substantially in the same manner, as second lenses 122. The orientation where first lens plate 111 is disposed is equal to that of second lens plate 112 turned by 180 degrees about center line CL. In addition, first lens plate 111 is disposed while being shifted from second lens plate 112 by m×PY/2 (m is an integer other than 0) in the long-side direction of first lens plate 111 (Y direction).

Reference sign CL indicates a center line of the lens unit. In the case where first lenses 121 and second lenses 122 are arranged in two rows, center line CL is a straight line parallel with the lens rows and located in an intermediate portion between the two lens rows. In the case where first lenses 121 and second lenses 122 are arranged in a single row, center line CL matches a straight line along which the lenses are arranged. Positioning protrusions 172 are configured to reduce the warp of second lens plate 112 in the width direction of second lens plate 112 (X direction) by butting against lens plate positioning portions 44 of mask 23, and thus to reduce the misalignment between the optical axes of second lenses 122 and first diaphragms 22 of FIG. 7 in the width direction of second lens plate 112 (X direction).

Likewise, in first lens plate 111 which is located at the back side of second lens plate 112 and is not illustrated in FIG. 8, positioning protrusions 171 are configured to reduce the warp of first lens plate 111 in the width direction of first lens plate 111 (X direction) by butting against lens plate positioning portions 44 of mask 23, and thus to reduce the misalignment among the optical axes of first lenses 121, first diaphragms 22, and second diaphragms 24 of FIG. 7 in the width direction of first lens plate 111 (X direction).

Long-side direction positioning protrusion 182 is configured to reduce the misalignment between the optical axes of second lenses 122 and first diaphragms 22 of FIG. 7 in the long-side direction of second lens plate 112 (Y direction) by being fitted into one of lens plate long-side direction positioning portions 45 of mask 23. Likewise, in first lens plate 111, which is located at the back side of second lens plate 112 and is not illustrated in FIG. 8, long-side direction positioning protrusion 181 is configured to reduce the misalignment among the optical axes of first lenses 121, first diaphragms 22, and second diaphragms 24 of FIG. 7 in the long-side direction of first lens plate 111 (Y direction) by being fitted into the other lens plate long-side direction positioning portion 45 of mask 23.

Lens plate positioning portions 44 of mask 23 are arranged symmetrically with respect to center line CL of second lens plate 112 (i.e., first lens plate 111 and second lens plate 112 of FIG. 7) in the width direction of mask 23 (X direction) as a symmetrical axis. In other words, left lens plate positioning portions 44 and right lens plate positioning portions 44 in the width direction of mask 23 in FIG. 8 (X direction) are both arranged distance LX away from center line CL in the width direction of mask 23.

Lens plate long-side direction positioning portions 45 of mask 23 are arranged at both sides of second diaphragms 24 in the width direction of mask 23 in FIG. 7 (X direction). Left and right lens plate long-side direction positioning portions 45 in the width direction of mask 23 in FIG. 8 (X direction) are arranged while being shifted from each other by m×PY/2 (m is an integer other than 0) in the long-side direction of mask 23 (Y direction).

FIG. 9 is a cross-sectional view of the lens unit of the second embodiment. In lens unit 1, mask 23, first lens plate 111, light blocking plate 21, and second lens plate 112 are arranged in this order from a lower part in FIG. 9. The interval between surfaces of these members is described using FIG. 9. In FIG. 9, the distance between first lenses 121 and object plane OP, which is a plane in which object (LED element) 30a is placed, is set at LO. Interval LS between surfaces of first lenses 121 and second lenses 122 is set at (2×LI1). Interval LI between imagine plane IP and the surface of second lenses 122 is set at L01, and the thickness of each second lens 122 is set at LT1 which is the same as that of each first lens 121.

The shapes of both surfaces of second lenses 122 are the same as those of first lenses 121. However, first lenses 121 and second lenses 122 are arranged in the opposite direction. They are arranged turned by 180 degrees with respect to each other in such a way that the surface of second lenses 122 on the object plane side is equal to the surface of first lenses 121 on the imaging plane side, and the surface of second lenses 122 on the imaging plane side is equal to the surface of first lenses 121 on the object plane side. First lens 121 forms intermediate image 30b in intermediate image plane IMP which is distance LI1 away from first lens 121 in the direction of optical axis AXL, as an image of object 30a which is distance LO1 away from first lens 121 in the direction of optical axis AXL. Intermediate image 30b formed at this time is an inverted reduced image of object 30a.

Second lens 122 forms image 30c of intermediate image 30b which is distance LI1 away from second lens 122, in imaging plane IP which is distance LO1 away from second lens 122 in the direction of optical axis AXL. Image 30c formed at this time is a same-size erect image of object 30a. Now, a description is given of how the above configuration works. Note that the operations of the printer and the LED head are the same as those of the first embodiment and thus a description thereof is omitted.

In this embodiment, as illustrated in FIG. 8, lens plate positioning portions 44 of mask 23 are arranged symmetrically with respect to center line CL in the width direction of mask 23 (X direction). In other words, left lens plate positioning portions 44 and right lens plate positioning portions 44 in the width direction of mask 23 (X direction) are both arranged a distance LX away from center line CL in the width direction of mask 23.

Further, as illustrated in FIG. 7, lens plate positioning portions 44 arranged on both sides of mask 23 in the width direction of mask 23 (X direction) are in contact with both positioning protrusions 171 arranged on both sides of first lens plate 111 in the width direction of first lens plate 111 (X direction) and positioning protrusions 172 arranged on both sides of second lens plate 112 in the width direction of second lens plate 112 (X direction). Thereby, the warp of first lens plate 111 and second lens plate 112 in their width direction (X direction) is reduced. In addition, since lens plate positioning portions 44 determine the positions of first lens plate 111 and second lens plate 112 in the width direction of LED head 3, the optical axes of first lenses 121 can be accurately aligned with the optical axes of second lenses 122.

As described above, in the second embodiment, the lens plate positioning portions arranged on both sides of the mask in the width direction of the mask are in contact with both the positioning protrusions arranged on both sides of the first lens plate in the width direction of the first lens plate and the positioning protrusions arranged on both sides of the second lens plate in the width direction of the second lens plate. This brings about effects of reducing the warp of the lens plates and facilitating building up the lens unit highly accurately. This also brings about an effect of increasing productivity of the lens unit without having to prepare lens plates of different shapes for object side and imaging side.

(Third Embodiment)

Figure 10:
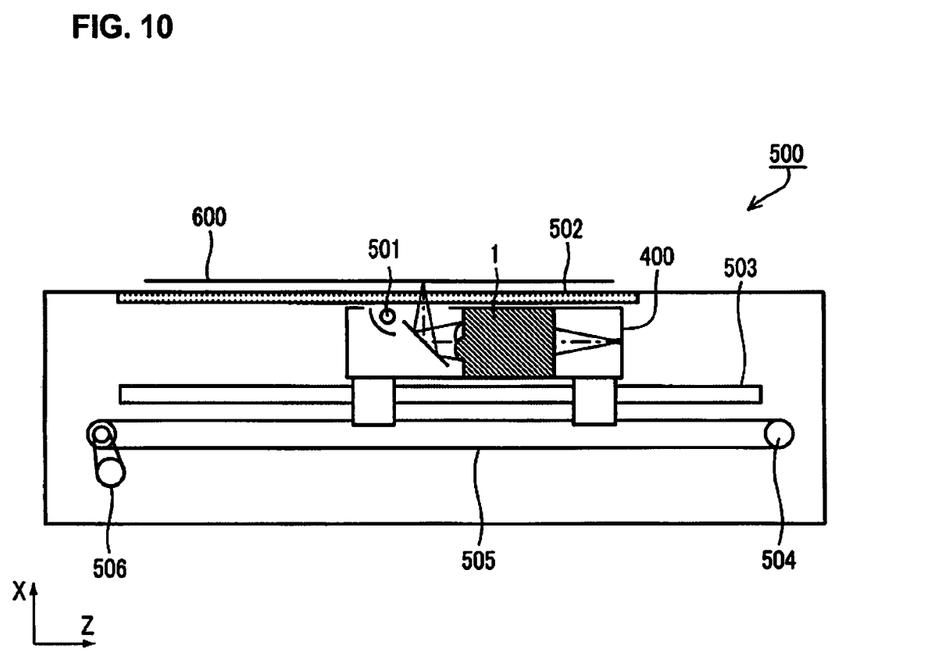
FIG. 10 is a schematic view illustrating a configuration of a reading apparatus according to a third embodiment of the invention.

A configuration of a third embodiment of the invention is described based on FIG. 10 which is a schematic view illustrating a configuration of a reading apparatus according to the third embodiment. Note that parts of the third embodiment which are the same as those of the first embodiment described above are given the same reference signs and description thereof is omitted. In FIG. 10, reference sign 500 indicates a scanner as a reading apparatus configured to read an original document and create electronic data of the original document as image data.

Scanner 500 includes reading head 400, lamp 501, platen 502, rail 503, drive belt 505, motor 506, and the like. Reading head 400 is configured to capture light rays emitted from lamp 501 as a lighting device and reflected by a surface of original document 600 and to convert the light rays into electronic data. Lamp 501 is disposed at such a position that light rays emitted from lamp 501 are reflected by the surface of original document 600 and captured by reading head 400.

Platen 502 is used for placing thereon original document 600 from which electronic data is created, and is made of a material designed to transmit visible light. Rail 503 is disposed below platen 502 and makes reading head 400 movable. Part of reading head 400 is connected to drive belt 505 wound around pulleys 504, and is movable on rail 503 by means of drive belt 505 driven by motor 506.

Figure 11:
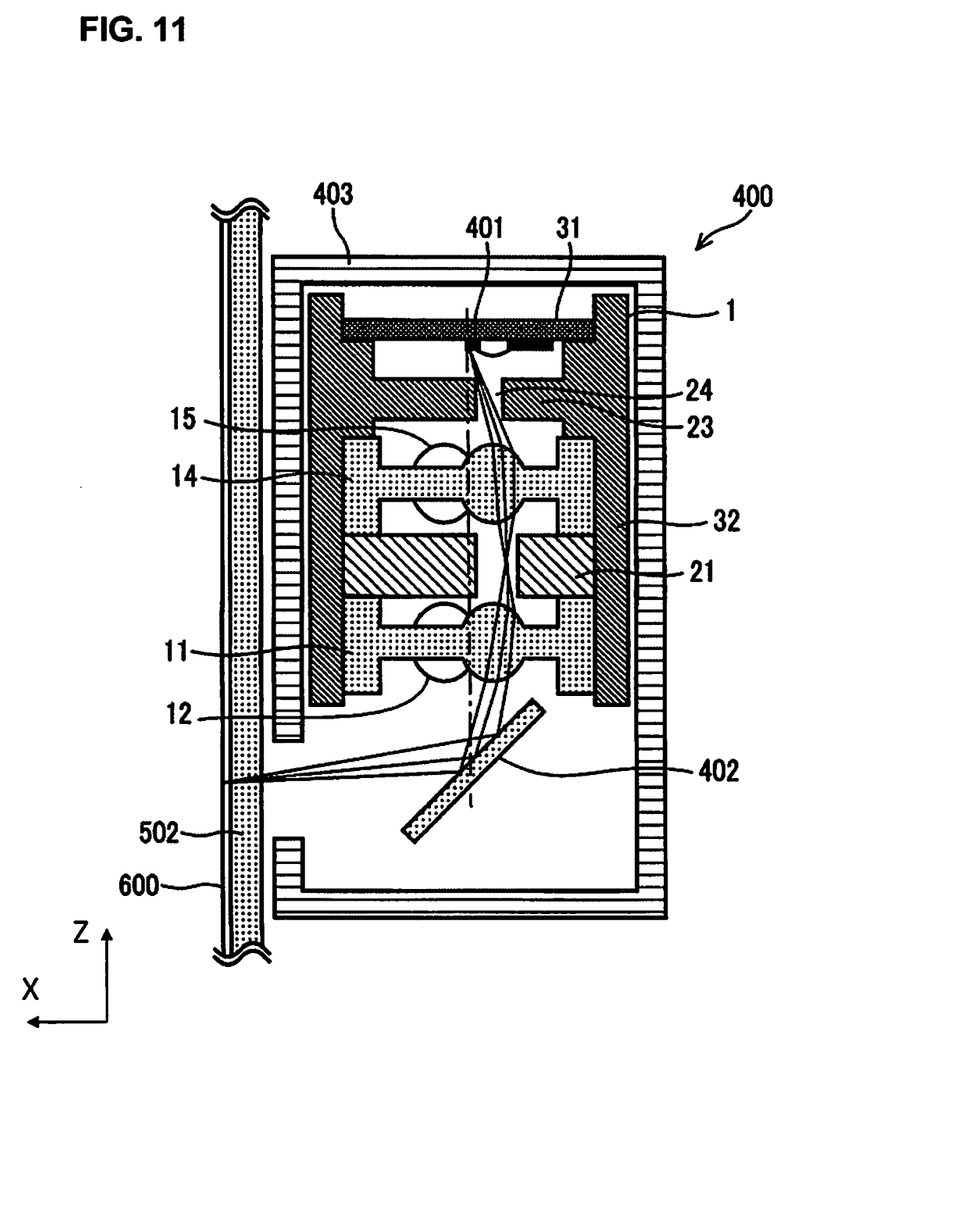
FIG. 11 is a schematic view illustrating a configuration of a reading head in the reading apparatus of the third embodiment.

Next, a configuration of reading head 400 is described based on FIG. 11 which is a schematic view illustrating the configuration of the reading head in the reading apparatus of the third embodiment. FIG. 11 is a cross-sectional view of FIG. 10 taken along a plane orthogonal to a long-side direction of lens unit 1, in which the long-side direction of lens unit 1 is equal to a front-back direction of the drawing. Mirror 402 is located in a lower part of the drawing, and line sensor 401 is located in an upper part of the drawing. In FIG. 11, reading head 400 includes lens unit 1, line sensor 401, and mirror 402. Lens unit 1 mentioned here is lens unit 1 described in the first embodiment.

Holder 32 is formed integrally with mask 23 across the long-side direction of lens unit 1, and fixes therein first lens plate 11, second lens plate 14, light blocking plate 21, and mask 23. Mirror 402 is configured to bend the optical path of light rays reflected by original document 600 so that the light rays are incident on lens unit 1. Line sensor 401 has light reception elements arranged linearly at pitch PR in the long-side direction of lens unit 1 (first direction) on substrate 31 serving as a light-reception-element array, and is configured to convert, into electrical signals, an image of the original document image formed by lens unit 1.

In this embodiment, the components are arranged in such a way that original document 600 constitutes object plane OP of lens unit 1 illustrated in FIGS. 6 and 9, and line sensor 401 constitutes imaging plane IP of lens unit 1. Mask 23 as a second light blocking member is disposed between second lens plate 14 and line sensor 401, and second diaphragms 24 are arranged to match the optical axes of first lenses 12. In other words, second diaphragms 24 are arranged on the optical axes of second lenses 15 and between second lenses 15 and line sensor 401.

Now, a description is given of how the above configuration works.

First of all, an operation of the reading apparatus is described based on FIG. 10.

Once lamp 501 is turned on and emits light to the surface of original document 600, light rays reflected by the surface of original document 600 are captured by reading head 400. Together with lamp 501, reading head 400 is moved in a lateral direction of FIG. 10 by drive belt 505 driven by motor 506, and captures light rays reflected by the entire surface of original document 600.

Next, an operation of reading head 400 is described based on FIG. 11.

Light rays reflected by original document 600 are transmitted through platen 502, and then enter lens unit 1 with their optical paths bent by mirror 402. Lens unit 1 forms an image of original document image on line sensor 401. Line sensor 401 converts the image of the original document image thus formed into electrical signals to generate electronic data.

In this embodiment, as illustrated in FIG. 4, lens plate positioning portions 44 of mask 23 are in contact with both positioning protrusions 17 of first lens plate 11 and positioning protrusions 19 of second lens plate 14. Thereby, the warp of first lens plate 11 and second lens plate 14 is reduced. In addition, since lens plate positioning portions 44 determine the positions of first lens plate 11 and second lens plate 14 in the width direction of reading head 400 (X direction), the optical axes of first lenses 12 can be accurately aligned with the optical axes of second lenses 15. As a result, image (electronic) data with quality as good as the original document can be obtained.

Note that this embodiment is described by using lens unit 1 of the first embodiment as lens unit 1 of this embodiment. Alternatively, lens unit 1 of the second embodiment may be used.

As described above, the third embodiment brings about an effect that the reading apparatus can also achieve the same effect as the first and second embodiments and can read image data with the same quality as the original document.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A lens unit comprising:
   a first lens plate including first lenses arranged in a first direction and configured to form an intermediate image being an inverted reduced image of an object;
   a second lens plate including second lenses arranged in the first direction and configured to form an inverted enlarged image of the intermediate image on a light reception surface; and
   a positioning portion in contact with both a positioning protrosion formed on the first lens plate and a positioning protrosion formed on the second lens plate.

2. The lens unit according to claim 1, wherein the positioning portion is in contact with both the positioning protrosion of the first lens plate and the positioning protrosion of the second lens plate so as to position the first and second lens plate in a third direction orthogonal to both the first direction and a second direction, wherein the second direction is a direction parallel with optical axes of the first lenses.

3. The lens unit according to claim 2, further comprising:
   another positioning portion in contact with both the first lens plate and the second lens plate so as to position the first and second lens plate in the first direction.

4. The lens unit according to claim 1, further comprising a holding member including the positioning portion formed therein and configured to hold the first lens plate and the second lens plate.

5. The lens unit according to claim 1, further comprising a light blocking member including diaphragms arranged in the first direction and including the positioning portion formed therein.

6. The lens unit according to claim 5, wherein the diaphragms of the light blocking member are arranged between the object and the first lenses.

7. The lens unit according to claim 6, further comprising another light blocking member including diaphragms arranged in the first direction and provided between the first lens plate and the second lens plate.

8. The lens unit according to claim 1, further comprising:
   a light blocking member including a positioning portion and including diaphragms arranged in the first direction; and
   a holding member configured to hold the first lens plate and the second lens plate, wherein
   the light blocking member and the holding member are formed integrally.

9. The lens unit according to claim 8, wherein the diaphragms of the light blocking member are arranged between the object and the first lenses.

10. The lens unit according to claim 9, further comprising another light blocking member including diaphragms arranged in the first direction and provided between the first lens plate and the second lens plate.

11. The lens unit according to claim 1, wherein the positioning portion is disposed at each of both sides of the first lenses in a third direction, where the third direction is a direction orthogonal to the first direction and a second direction, wherein the second direction is a direction parallel with optical axes of the first lenses.

12. The lens unit according to claim 11, wherein the positioning portions are arranged symmetrically with respect to a center line of the first lens plate in the third direction as a symmetrical axis.

13. An exposure device comprising:
    the lens unit according to claim 1; and
    a light-emitting-element array including light emitting elements arranged in the first direction.

14. An LED head comprising:
    the lens unit according to claim 1; and
    a light-emitting-element array including LED elements arranged in the first direction.

15. An image formation apparatus comprising:
    the lens unit according to claim 1; and
    a light-emitting-element array including light emitting elements arranged in the first direction.

16. A reading apparatus comprising:
    the lens unit according to claims 1; and
    a light-reception-element array including light reception elements arranged in the first direction.

* * * * *